United States Patent [19]

Teeters

[11] Patent Number: 5,084,210

[45] Date of Patent: Jan. 28, 1992

[54] CORROSION INHIBITOR

[75] Inventor: Susan M. Teeters, Sand Springs, Okla.

[73] Assignee: Chemlink Incorporated, Plano, Tex.

[21] Appl. No.: 476,745

[22] Filed: Feb. 7, 1990

[51] Int. Cl.$^5$ .................................... C23F 11/10
[52] U.S. Cl. .............................. 252/392; 252/8.555; 252/8.554; 252/8.553; 252/393; 422/9; 422/10; 422/16
[58] Field of Search ............... 422/9, 10, 16; 252/387 APS, 389.1 APS, 390 APS, 8.555 APS, 396 APS, 392 APS, 8.552 APS, 8.553 APS, 8.554 APS, 393 APS, 393 APS

[56] References Cited

U.S. PATENT DOCUMENTS

| | | | |
|---|---|---|---|
| H751 | 3/1990 | Sullivan et al. | 252/8.553 |
| 2,472,400 | 6/1949 | Bond et al. | 252/8.555 |
| 2,814,593 | 11/1957 | Beiswanger et al. | 252/8.553 |
| 2,993,863 | 7/1961 | Monroe et al. | 252/8.553 |
| 3,077,454 | 2/1963 | Monroe et al. | 252/8.555 |
| 3,098,700 | 7/1963 | Bernard | 422/16 |
| 3,107,221 | 10/1963 | Harrison et al. | 252/148 |
| 3,205,169 | 9/1965 | Kirkpatrick | 252/8.553 |
| 3,382,179 | 5/1968 | Keeney | 252/8.553 |
| 3,482,636 | 12/1969 | Crowe et al. | 166/307 |
| 3,529,669 | 9/1970 | Tietz | 166/307 |
| 3,579,445 | 5/1971 | Tate | 252/8.552 |
| 3,705,106 | 12/1972 | Muzyczko et al. | 252/8.555 |
| 3,932,296 | 1/1976 | Byth | 252/392 X |
| 4,028,268 | 6/1977 | Sullivan, 3rd et al. | 252/8.553 |
| 4,077,879 | 3/1978 | Smeck | 210/754 |
| 4,353,806 | 10/1982 | Canter et al. | 252/8.554 |
| 4,360,061 | 11/1982 | Canter et al. | 166/274 |
| 4,420,414 | 12/1983 | Valone | 252/8.555 |
| 4,464,268 | 8/1984 | Schievelbein | 252/8.552 |
| 4,473,115 | 9/1984 | Oakes | 252/8.555 X |
| 4,495,200 | 1/1985 | Linstrom et al. | 252/8.555 |
| 4,498,997 | 2/1985 | Walker | 252/8.553 |
| 4,522,658 | 6/1985 | Walker | 252/8.553 |
| 4,636,256 | 1/1987 | Valone | 252/8.555 |
| 4,675,120 | 6/1987 | Martucci | 258/8.552 |
| 4,696,752 | 9/1987 | Lysandrou et al. | 252/8.553 |
| 4,823,826 | 4/1989 | Sacco | 137/1 |

Primary Examiner—Deborah L. Kyle
Assistant Examiner—Valerie Fee
Attorney, Agent, or Firm—Rosenblatt & Associates

[57] ABSTRACT

A corrosion inhibitor including an acetylinic alcohol is disclosed which is used in connection with a chlorine dioxide process for controlling biomass and cleaning water injection wells and oil producing wells by injecting the chlorine dioxide oxidant into the pumped water injection stream.

20 Claims, 1 Drawing Sheet

CORROSION INHIBITOR

CROSS-REFERENCE TO RELATED APPLICATION

This is a related application of U.S. Patent Application Ser. No. 06/944,794 filed Dec. 22, 1986, now U.S. Pat. No. 4,823,826 for "Process and Apparatus for Introducing Aqueous Chlorine Dioxide into High Pressure Water Injection Systems."

BACKGROUND OF THE INVENTION

1. Field of the Invention

The field of the present invention is the treatment of high pressure water injection wells. Another aspect of the present invention is concerned with a corrosion inhibitor for use in connection with injection well treatment water, and in particular water which is acidic or which includes chlorine dioxide.

2. Related Art

The oil industry uses a variety of techniques to maximize the recovery of oil from any particular oil formation. One of the methods used is the injection of water under high pressure at a point removed from the site of the oil removal. Large amounts of water are injected under high pressure into the oil-producing sands and are removed at the oil well site along with the resident oil. Such methods typically require up to twenty parts water per part oil recovered. Given this large amount of required water, many oil producers utilize the nearest large source of water, which can be a surrounding ocean, nearby bay, or water produced with the oil. Little care is taken to purify the injection water and, therefore, a wide variety of impurities are often injected in the water injection well.

The constant high volume flow of impure water and the warm, incubator-like environment of oil field water treatment systems encourages the uncontrolled growth of biomass—the source of many costly problems. Bacterial growth, if left unchecked, causes: formation of hydrogen sulfide, a toxic and corrosive gas that eats through piping in water and vapor recovery systems; accumulation of gummy biomass that adheres to surfaces and filter media and substantially reduces equipment efficiency; formation of abrasive iron sulfide that wears injection pumps, decreases injectivity, fouls flow lines and causes corrosion; all increasing operating costs and lowering oil production. The resultant build-up at the screen leading from the casing into the oil-producing sands constricts the flow of water through the tubing and screen. As the flow is constricted, less water can be pumped through the system, leading to decreased oil production. If the water injection tubing and screen are not cleaned out periodically, the screen can become entirely obstructed.

A commonly accepted procedure for cleaning out such water injection casings is to inject hydrochloric acid into the water injection well. The hydrochloric acid, by keeping the pH of the system low, solubilizes some of the unwanted materials so that they can be washed out of the water injection well. This method suffers from several problems. First, such mixtures can be highly corrosive and will corrode the water injection well. In addition, such a mixture has little or no effect on any biomass that may have built up. Such biomass is often the primary obstructor. Finally, this method of clean-out is relatively expensive.

Typical aqueous hydrochloric acid solutions include 15% by volume hydrochloric acid or 12% by volume hydrochloric acid and 3% by volume hydrofluoric acid. Although such solutions facilitate the injectivity of injection wells by reacting with carbonate scales on the well and pipe walls, the solutions are very corrosive to the iron pipes causing etching leading to further degradation. Moreover, once the hydrochloric acid is dissipated in the water flow, hydrogen sulfide from the injection well reappears thereby causing further carbonate scale formation.

To inhibit the corrosive effects of hydrochloric acid and hydrofluoric acid solutions, corrosion inhibitors are typically added to the water flow. Typical inhibitors include quaternary amines and acetylene alcohols, which are admixed with a surfactant in an aqueous solution.

Chlorine dioxide has found its way into limited use in the oil production industry. This material has been recognized for the treatment of oil field produced fluids. Reference is made to Canadian Patent No. 1,207,269, issued July 8, 1986, the disclosure of which is incorporated herein by reference. Reference is also made to Smeck, U.S. Pat. No. 4,077,879, issued Mar. 7, 1978. In these processes, the chlorine dioxide is typically used for surface treatment of oil field produced fluids.

See also, Masschelein, W. J. "Chlorine Dioxide-Chemistry and Environmental Impact of Oxychlorine Compounds", Ann Arbor Science Publishers, Inc. (1979), the disclosure of which is incorporated herein by reference.

Chlorine dioxide is known to be a highly corrosive material. Corrosion of metals due to chlorine dioxide is characterized by severe pitting corrosion. Corrosion of this type can lead to catastrophic failures of metals exposed to this environment.

Therefore, there exists a need for inhibiting corrosion caused by chlorine dioxide and other acids if chlorine dioxide and such acids are used in a process to treat water injection or oil-producing wells.

SUMMARY OF THE INVENTION

The present invention is directed to a corrosion inhibitor which can be used in connection with a chlorine dioxide based process for removing or controlling the build-up of deposits in a water injection or oil-producing well. In the chlorine dioxide based process, chlorine dioxide is manufactured and then injected under high pressure into a high pressure water injection stream into a well. The chlorine dioxide in the water injection stream removes biomass and dissolves the resultant biomass and iron sulfides that may have built up within the water injection casing and at the screen leading to the oil-producing formation. The pH of the combined injection stream is maintained at a level that avoids excessive corrosion of the injection casing, screen, or other well parts.

It has been found that a unique corrosion inhibitor can be added to the flowing water downstream from the chlorine dioxide generation point. The corrosion inhibitor not only reduces the corrosion rate, but also unexpectedly facilitates the elimination of pitting type corrosion. In this regard, it should be appreciated that the corrosion inhibitor in general will inhibit acid corrosion, not just corrosion from chlorine dioxide.

The corrosion inhibitor of the present invention is a solution comprising at least four components, namely, a cyclic quaternary amine, a surfactant, an acetylinic alcohol and a solvent. The corrosion inhibitor solutions of the present invention have been found effective for chlorine dioxide concentrations in flowing water of 0.01% to 10% by volume.

Use of the inhibitor solutions of the present invention allows for utilization of high concentrations of chlorine dioxide in a process for removing or controlling the buildup of deposits in a water injection or oil producing well which is chlorine dioxide based, without experiencing high corrosion rates on equipment or well tubing, valves and other well components.

DETAILED DESCRIPTION OF THE PREFERRED EMBODIMENTS

Figure 1:
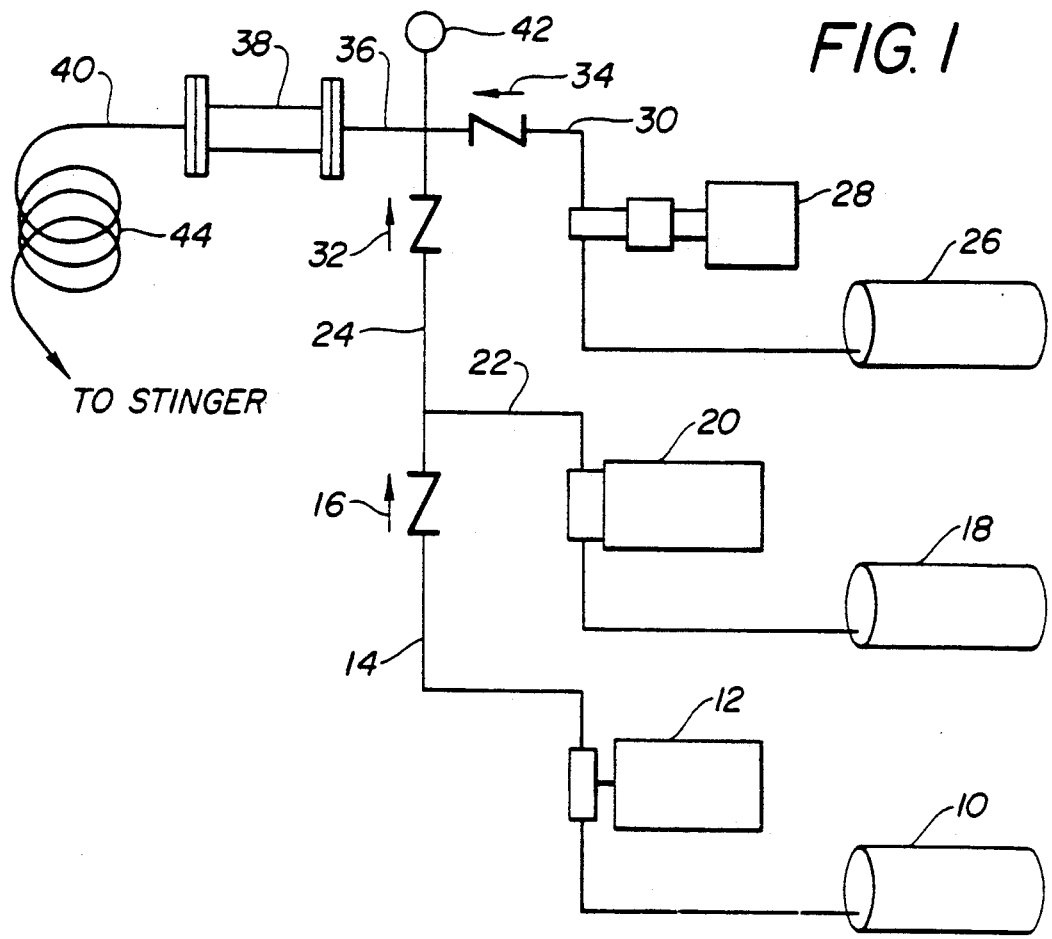
FIG. 1 illustrates schematically a process reactor for producing chlorine dioxide

The present invention is directed to a corrosion inhibitor solution which is used in connection with a chlorine dioxide based process for removing or controlling the build up of deposits in a water injection or oil producing well. The corrosion inhibitors of the present invention comprise at least four components, namely, a cyclic quaternary amine, a surfactant, an acetylinic alcohol and a solvent. Preferably, the surfactant is a non-ionic surfactant, and the solvent is a water or alcoholic solution.

Cyclic quaternary amine compounds include bicyclic quaternary amine compounds and also include alkyl pyridine quaternary amine in which the alkyl is any alkyl group, benzyl quaternary amine, cocodimethyl benzyl quaternary amine, soya trimethyl quaternary amine, quinoline quaternary amine and mixtures thereof. Alkyl pyridine is preferred.

Acetylinic alcohols include any of the family of alcohols containing a tertiary bond such as ethyl octynol, propargyl alcohol, butyne diol and butyne diol methoxylates and mixtures thereof, with ethyl octynol and propargyl alcohol preferred. In this regard, ethyl octynol is more preferred in water flows with temperatures above 200° F. or at temperatures lower than 50° F.

The surfactant is preferably non-ionic and includes nonyl phenol ethoxylate, ethoxylated alcohols, ethoxylated amines and mixtures thereof. One surfactant is sold by Rohm & Haas under the trademark Triton X100.

All of the, above ethoxylated compounds have varying amounts of ethylene oxide added to them. For purposes of the present invention, from 1% to 14% by volume can be added, although higher quantities are also acceptable. Further, ethoxylated amines that can be of use include those in the C12-C18 range such as soya amines, coco amines, tallow diamines and laurel amines.

The solvent is preferably a non-hydrocarbon such as water/IPA; however, straight chain alcohols such as methyl and ethyl alcohols may also be used as well as other low weight alcohols such as isopropyl alcohol and mixtures thereof.

The corrosion inhibitor is preferably pre-mixed, and can be injected into the water flow line downstream from the source of chlorine dioxide. For example, referring to FIGS. 1 and 2, downstream from the low pressure reactor 54.

The chlorine dioxide is injected into the water flow line at a pressure commensurate with the pressure of the flow, for example, 50–5000 psi. At higher temperatures of the flow, an increased amount of corrosion inhibitor is needed.

Preferably, the inhibitor is injected into the water flow line at a point close to the reactor, but downstream. In such case it is possible to use hard steel pipes downstream rather than more expensive Kynar pipe.

The inhibitors have been found effective for chlorine dioxide concentration of 0.01% to 10% by volume. Temperatures ranging from 50° F. to 200° F. do not impact upon the performance of the preferred inhibitor solutions. Pressure has no effect on the performance of the inhibitors.

Use of these inhibitors allows for the utilization of high concentrations of chlorine dioxide without experiencing high corrosion rates on equipment, well tubing or valves. The inhibitors are also not oxidized by chlorine dioxide.

In general, the inhibitor solutions will include, in volume percent, from 1 to 80 cyclic quaternary amine from 0.5 to 50 surfactant, from 0.5 to 50 acetylinic alcohol and from 10 to 80 solvent. Preferably, the inhibitor solutions will include in volume percent, from 10 to 40 cyclic quaternary amine, from 1 to 40 surfactant, from 1 to 15 acetylinic alcohol and from 5 to 60 solvent.

The amount of inhibitor solution injected into the chlorine dioxide based flowing water system will depend upon the concentration of chlorine dioxide. For chlorine dioxide concentrations ranging from 0.01% to 10% by volume, from 0.0025 to 10 volume percent of the corrosion inhibitor solution is employed. Typically, the amount of corrosion inhibitor employed ranges from 25 to 100% of the chlorine dioxide concentration and preferably from 25 to 75% of the chlorine dioxide concentration.

Examples of corrosion inhibitor solutions are set forth below:

EXAMPLE 1

| INGREDIENT | % |
| --- | --- |
| Isopropyl Alcohol | 30 |
| Alkyl Pyridine Quaternary Amine | 20 |
| Nonyl Phenol Ethoxylate (10 mole) | 5 |
| Nonyl Phenol Ethoxylate (14 mole) | 10 |
| Ethyl Octynol | 10 |
| Water | 25 |

EXAMPLE 2

| INGREDIENT | % |
| --- | --- |
| Isopropyl Alcohol | 50 |
| Alkyl Pyridine Quaternary Amine | 10 |
| Ethyl Octynol | 10 |
| Water | 30 |

EXAMPLE 3

| INGREDIENT | % |
| --- | --- |
| Isopropyl Alcohol | 30 |
| Quinoline Quaternary Amine | 20 |
| Nonyl Phenol Ethoxylate (10 mole) | 10 |
| Nonyl Phenol Ethoxylate (14 mole) | 10 |
| Ethyl Octynol | 10 |
| Water | 20 |

EXAMPLE 4

| INGREDIENT | % |
|---|---|
| Isopropyl Alcohol | 30 |
| Cocodimethyl Benzyl Quaternary Amine | 20 |
| Nonyl Phenol Ethoxylate (10 mole) | 10 |
| Nonyl Phenol Ethoxylate (14 mole) | 10 |
| Ethyl Octynol | 10 |
| Water | 20 |

EXAMPLE 5

| INGREDIENT | % |
|---|---|
| Isopropyl Alcohol | 30 |
| Alkyl Pyridine Quaternary Amine | 20 |
| Ethoxylated Soya Amine (10 mole) | 10 |
| Ethoxylated Soya Amine (14 mole) | 10 |
| Ethyl Octynol | 10 |
| Water | 20 |

EXAMPLE 6

| INGREDIENT | % |
|---|---|
| Isopropyl Alcohol | 30 |
| Alkyl Pyridine Quaternary Amine | 20 |
| Ethoxylated Soya Amine (14 mole) | 10 |
| Nonyl Phenol Ethoxylate (14 mole) | 10 |
| Ethyl Octynol | 10 |
| Water | 20 |

EXAMPLE 7

| INGREDIENT | % |
|---|---|
| Isopropyl Alcohol | 30 |
| Alkyl Pyridine Quaternary Amine | 20 |
| Ethoxylated Soya Amine (10 mole) | 10 |
| Nonyl Phenol Ethoxylate (14 mole) | 10 |
| Ethyl Octynol | 10 |
| Water | 20 |

EXAMPLE 8

| INGREDIENT | % |
|---|---|
| Isopropyl Alcohol | 30 |
| Quinoline Ouaternary Amine | 20 |
| Ethoxylated Soya Amine (14 mole) | 10 |
| Nonyl Phenol Ethoxylate (10 mole) | 10 |
| Ethyl Octynol | 10 |
| Water | 20 |

EXAMPLE 9

| INGREDIENT | % |
|---|---|
| Isopropyl Alcohol | 10 |
| Alkyl Pyridine Quaternary Amine | 60 |
| Nonyl Phenol Ethoxylate (10 mole) | 5 |
| Nonyl Phenol Ethoxylate (14 mole) | 5 |
| Ethyl Octynol | 10 |
| Water | 10 |

EXAMPLE 10

| INGREDIENT | % |
|---|---|
| Isopropyl Alcohol | 30 |
| Alkyl Pyridine Quaternary Amine | 20 |
| Nonyl Phenol Ethoxylate (10 mole) | 10 |
| Nonyl Phenol Ethoxylate (14 mole) | 10 |
| Ethyl Octynol | 10 |
| Water | 20 |

EXAMPLE 11

| INGREDIENT | % |
|---|---|
| Isopropyl Alcohol | 35 |
| Alkyl Pyridine Quaternary Amine | 20 |
| Nonyl Phenol Ethoxylate (14 mole) | 10 |
| Ethyl Octynol | 10 |
| Water | 25 |

EXAMPLE 12

| INGREDIENT | % |
|---|---|
| Isopropyl Alcohol | 35 |
| Alkyl Pyridine Quaternary Amine | 20 |
| Nonyl Phenol Ethoxylate (10 mole) | 10 |
| Ethyl Octynol | 10 |
| Water | 25 |

(Note that in the above examples, "(10 or 14 mole)" adjacent to a component means that the component source was ethoxylated with 10 or 14 moles ethylene oxide, for example "(10 mole)" adjacent to a component means that the component source was ethoxylated with 10 moles of ethylene oxide.)

The corrosion inhibitor solutions of the present invention are used in a chlorine dioxide based, process for removing or controlling the buildup of deposits in a water injection or oil producing well. The chlorine dioxide based process involves mixing water, hydrochloric acid, sodium chlorate, or sodium chlorite and, optionally, sodium chloride, the mixing typically occurring under pressure. These ingredients may be mixed in a continuous flow reactor system which has three feed streams and one product stream. One feed stream is water. The second feed stream is composed of hydrochloric acid. The third contains the precursor stream comprised of sodium chlorate, sodium chlorite, and optional sodium chloride in a water stream.

Turning in detail to the drawing, a schematic of a process reactor system is illustrated in FIG. 1. A tank 10 contains a precursor comprised of sodium chlorate, sodium chlorite, and optional sodium chloride in a water base. This mixture is pumped by a precursor pump 12 in a precursor feedstream 14 through a check valve 16. A tank 18 contains water which is pumped by a water pump 20 in a feedstream 22 and combined with the feedstream 14 to form feedstream 24. Another tank 26 contains hydrochloric acid, which is pumped by an acid pump 28 in a feedstream 30. The feedstream 24 is pumped past a check valve 32 and the feedstream 30 is pumped past a check valve 34 where they are combined to form a reaction stream 36. The reaction stream 36 passes into a high pressure reactor 38 that is equipped with an in-line mixer.

A product stream 40 contains the resultant compounds, including a large proportion of chlorine dioxide. The pressure of the entire system is to be maintained at a level sufficient to keep the chlorine dioxide dissolved within the reaction mixture in a product stream 40. A pressure gauge 42 may be located near a reactor 38 or at any other convenient location. Normal pressures exceed 500 psi. The reactor 38 preferably operates at a pressure between 500 and 5000 pounds per square inch so that it may be readily used for downstream injection, either directly or through a booster pump, into the water injection well with a typical temperature of about 130° F.

The hydrochloric acid stream, 30 advantageously may be approximately 30% hydrogen chloride by weight, and a chlorine dioxide precursor stream 14 contains more than 10% sodium chlorate and/or sodium chlorite. At levels above 35%, the capacity to solubilize can be exceeded. In a more preferred embodiment, the precursor stream 14 contains approximately 28% sodium chlorate, approximately 3% sodium chlorite and about 7% sodium chloride. It would be obvious to one of ordinary skill in the art to optimize the feed rate of the various feed streams to obtain the most efficient and economical result. Given the streams just described, the preferred embodiment would continuously feed equal parts of each of the three feed streams 14, 22 and 30. Such a reaction would produce a product stream 40 containing roughly one pound of chlorine dioxide for every gallon of precursor feed stream 14 and the product stream 40 would have a pH of approximately 0.5.

While the use of sodium chloride is optional, it tends to increase the chlorine dioxide yield. On the other hand, it also results in increased salt formation and, therefore, requires additional water to adequately flush the reactor system. One optimization embodiment may involve the use of a slightly larger ratio of hydrochloric acid to the other two feed streams, resulting in a ratio of hydrochloric acid stream 30 to the water stream 22 to the precursor feed stream 14 of approximately 1.0/0.5/0.5. Of course, the optional ratio will vary depending on the conditions present at each individual site.

In addition, any strong mineral acid or other proton donor (e.g., sulfuric acid, nitric acid, or oxalic acid) can be used as a substitute for hydrochloric acid. For various reasons, such as the relative expense of the component or the resulting salt or other deposit-formations, however, hydrochloric acid is the component of choice.

Given the low pH of the reaction product, it is important to construct the reactor system of material not subject to excessive corrosion. One preferred embodiment of the present process utilizes a high pressure reactor system composed of, for example, molybdenum alloys such as one of the family of "HASTELLOY" alloys manufactured by Cabot Satellite Division, Kokomo, Indiana, for all items downstream from check valve 32.

Given the generally explosive nature of chlorine dioxide, or the need to maintain it in a dissolved, pressurized state, it is preferable that the chlorine dioxide be manufactured on-site. Such a reactor system, producing sufficient amounts of chlorine dioxide to service a typical water injection well, can be readily constructed on a truck or trailer to be transported to the site of the well.

At the well site, the product stream 40 is fed to the well. Several applications are possible. A stinger, also constructed of non-corrosive material such as one of the "HASTELLOY" materials discussed above, may be inserted into the injection well tubing. The stinger should be inserted to a depth such that any product stream emanating from the stinger tip will readily mix with the injection water, and thus, flow down into the injection well casing. To serve the same purpose of adequate and quick mixing, the stinger may be equipped with centralizers to maintain the tip of the stinger in the center of the injection well tubing. For increased adaptability, a preferred embodiment has a section of flexible hose or tubing 44 connecting the reactor system to the stinger apparatus. This tubing 44 should have a non-corrodible inner surface such as "TEFLON." Alternatively, a spool may be employed. Of course, the spool must also be of noncorrosive material. A coiled tube may also be used which is inserted through the well head to the depth of the perforations downhole. As such coiled tubing is not typically made of corrosion-resistant material, care must be taken to insure effective corrosion control throughout the treatment.

If the production process reactor is maintained at a sufficient pressure, injection into the injection well tubing will be easily accomplished. Standard water injection wells are designed to operate in the range of one thousand to four thousand psi and a higher pressure in the reactor system will enable simple injection.

The range of injection concentration as well as the amount of time during which the chlorine dioxide stream is injected can be varied to optimize the particular system. To avoid excessive corrosion of the injection well tubing or casing, it is preferable to maintain the rate of chlorine dioxide stream injection at a level so that the pH of the combined water injection and chlorine dioxide streams remains at 4.5 or above.

Figure 2:
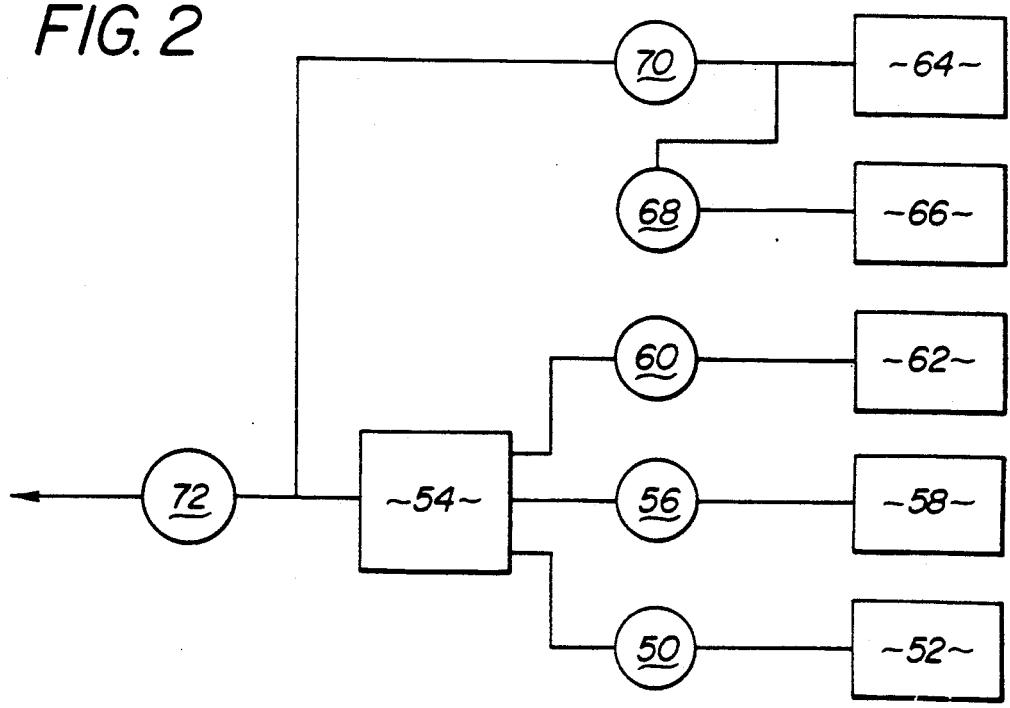
FIG. 2 illustrates schematically another process reactor for producing chlorine dioxide.

A second embodiment on the generator is illustrated in FIG. 2. In this system, a low pressure generator is used with a high pressure booster. Equipment costs and safety considerations suggest the use of such a low pressure generator system with a booster to achieve well head pressures. Looking to FIG. 2, a precursor pump 50 delivers precursor from tank 52 to the low pressure reactor 54. The reactor may be maintained at about 500 psi. An acid pump 56 similarly delivers acid from a tank 58 and a water pump 60 delivers water from a source 62.

Injection water is taken from a source 64. Inhibitor is added from a tank 66 by a pump 68 to the water stream. A recirculating pump 70 drives the water/inhibitor mixture to a high pressure booster pump 72. The high pressure stream is then injected into the well.

As discussed above, a corrosion inhibitor is preferably employed. Injection rates are such that the pH of the effluent stream into the well are low in the acid corrosion regime. Standard inhibitors used in surface applications are not effective in this type of application, The surface applications are normally at low dosages (<0.05% as precursor) and metal-containing inhibitors are effective. Chromium, from sodium dichromate, is a good example. Standard surface inhibitors actually accelerate the corrosion.

The inhibitors of the present invention inhibit both the oxidizer and acid corrosion experienced at high dosages of oxidant stream. The preferred inhibitor is effective at the lower pH ranges and does not contain components that would be reactive with the oxidant stream.

A typical clean-out procedure might involve setting up the chlorine dioxide injection system of the present invention when the flow rate of the water injection oil well has decreased to 25 to 50 percent of its original pumping capacity. If the well is a typical 1000-2000 barrel per day water injection well, the standard clean-out procedure might involve processing 30 gallons per hour of the precursor stream and injecting the resultant product stream into the well for a period of somewhere between 1 and 24 hours. After an appropriate treatment, typically more than 75% of the original pumping capacity of the well is restored.

In a specific example, water injection well treatment at a depth 1500 to 1600 feet into unconsolidated sand formations has been undertaken for six to twelve hours while the well continues to take water with no shut down. One to two drums of precursor and one to two drums of 30% HCl have been used to create an oxidant stream over the course of the pumping time. Results from such testing indicate that such a process is comparable for clearing wells to a normal acid job consisting of treatment with 1000 gal. of 15% HCl. Such a normal treatment involves shutting in the well, treating the well and leaving it shut in for up to 24 hours. The precursor has been a 9/1 mixture chlorate/sodium chlorite which is reacted with HCl. Sodium chlorite may also be used as an alternative precursor.

While embodiments and applications of this invention have been shown and described, it would be apparent to those skilled in the art that many more modifications are possible without departing from the inventive concepts herein. The invention, therefore, is not to be restricted except in the spirit of the appended claims.

1. A process for inhibiting oxidative pitting corrosion associated with chlorine dioxide including,
   generating a chlorine dioxide solution wherein the chlorine dioxide concentration ranges from 0.01% to 10% by volume; and
   injecting into the chlorine dioxide solution from about 25% to about 100% by volume based on chlorine dioxide of an inhibitor solution consisting essentially of a functionally operative proportion of a cyclic quaternary amine, a surfactant, an acetylinic alcohol and a solvent effective to inhibit oxidative pitting corrosion associated with chlorine dioxide.

2. The process according to claim 1 or 19 wherein the cyclic quaternary amine is selected from the group consisting of alkyl pyridine, benzyl quaternary amine quinoline quaternary amine, cocodimethyl quaternary amine, soya trimethyl quaternary amine and mixtures thereof.

3. The process according to claim 1 or 19 in the surfactant is selected from the group consisting of nonyl phenol ethoxylate, ethoxylated alcohol, ethoxylated amine and mixtures thereof.

4. The process of claim 1 or 10 wherein the acetylinic alcohol is selected from the group consisting of ethyl octynol, propargyl alcohol and mixtures thereof.

5. The process of claim 1 or 10 wherein the solvent is selected from the group consisting of isopropyl alcohol, ethyl alcohol, methyl alcohol, water and mixtures thereof.

6. The process according to claim 1 or 19 wherein the inhibitor solution consists essentially of an alkyl pyridine, quaternary amine nonyl phenol ethoxylate, ethyl octynol and isopropyl alcohol.

7. The process of claim 1 or 19 where in the cyclic quaternary amine ranges from 1 to 80% by volume, the surfactant ranges from 0.5 to 50% by volume, the acetylinic alcohol ranges from 0.5 to 50% by volume and the solvent ranges from 10 to 80% by volume.

8. The process of claim 7 wherein the cyclic quaternary amine ranges from 10 to 40% by volume, the surfactant ranges from 1 to 40% by volume, the acetylinic alcohol ranges from 1 to 15% by volume and the solvent ranges from 5 to 60% by volume.

9. A solution for inhibiting oxidative pitting corrosion associated with chlorine dioxide, consisting essentially of
   (a) from about 0.01% to 10% by volume of chlorine dioxide, and
   (b) from about 25% to about 100% by volume based on said chlorine dioxide concentration, of a functionally operative proportion of a cyclic quaternary amine, a surfactant, an acetylinic alcohol and a solvent effective to inhibit said corrosion.

10. The solution of claim 9 wherein the cyclic quaternary amines are selected from the group consisting of alkyl pyridine, benzyl quaternary amine, quinoline quaternary amine, cocodimethyl quaternary amine, soya trimethyl quaternary amine and mixtures thereof.

11. The solution of claim 9 wherein the surfactant is selected from the group consisting of nonyl phenol ethoxylate, ethoxylated alcohol, ethoxylated amine and mixtures thereof.

12. The solution of claim 9 wherein the acetylinic alcohol is selected from the group consisting of ethyl octynol, propargyl alcohol and mixtures thereof.

13. The solution of claim 9 wherein the solvent is selected from the group consisting of isopropyl alcohol, ethanol, methanol, water and mixtures thereof.

14. The solution of claim 9 wherein the cyclic quaternary amine ranges from 1 to 80% by volume, the surfactant ranges from 0.5 to 50% by volume, the acetylinic alcohol ranges from 0.5 to 50% by volume, and the solvent ranges from 10 to 80% by volume.

15. The solution of claim 14 wherein the cyclic quaternary amine ranges from 10 to 40% by volume, the surfactant ranges from 1 to 40% by volume, the acetylinic alcohol ranges from 1 to 15% by volume, and the solvent ranges from 5 to 60% by volume.

16. The process of claim 3 wherein the ethoxylated amine is selected from the group consisting of soya amines, coco amines, tallow diamines, laurel amines and mixtures thereof.

17. The solution of claim 11 wherein the ethoxylated amine is selected from the group consisting of soya amines, coco amines, tallow diamines, laurel amines and mixtures thereof.

18. The solution of claim 9 wherein the inhibitor solution comprises isopropyl alcohol, alkyl pyridine quaternary amine, nonyl phenol ethoxylate and ethyl octynol.

19. A process for treating subterranean wells to inhibit oxidative pitting corrosion, which comprises
   introducing into said well an aqueous fluid containing from about 0.01% to about 10% by volume of chlorine dioxide and an inhibitor additive present in an amount of from about 25% to about 100% by volume based on said chlorine dioxide, said inhibitor additive consisting essentially of a cyclic quaternary amine, a surfactant, and acetylinic alcohol and a solvent in a proportion effective to inhibit said corrosion, and
   pumping said aqueous fluid through said well to contact said fluid with metal surfaces in said well.

20. The process of claim 19 in which said aqueous fluid is introduced into said well at a pressure in the range from 50 to 5,000 p.s.i.

* * * * *